July 15, 1952 — G. PAVLINETZ — 2,603,679
TERMINAL HAVING SOLDERLESS CONDUCTOR CLAMPING MEANS
Filed June 23, 1949 — 3 Sheets-Sheet 1

INVENTOR
GEORGE PAVLINETZ
BY
Raymond W Cotter
ATTORNEY

July 15, 1952     G. PAVLINETZ     2,603,679
TERMINAL HAVING SOLDERLESS CONDUCTOR CLAMPING MEANS
Filed June 23, 1949     3 Sheets-Sheet 2
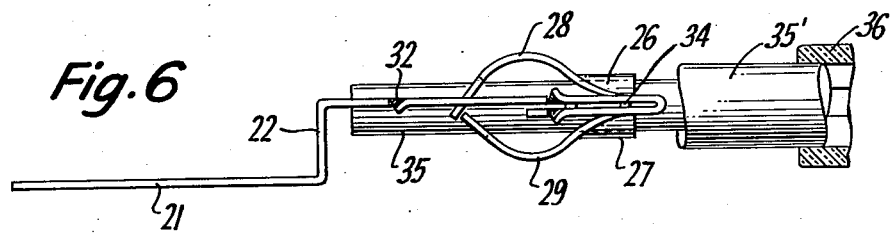
Fig. 6
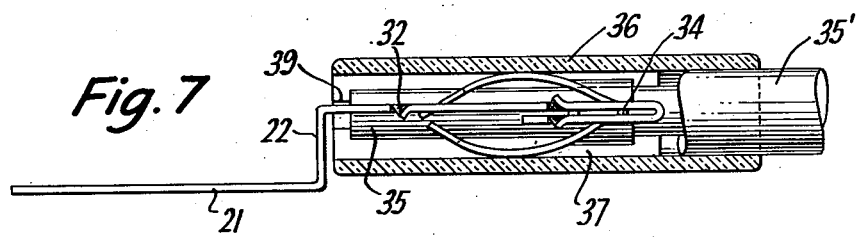
Fig. 7
Fig. 9     Fig. 8     Fig. 10
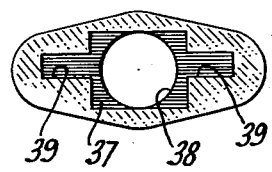 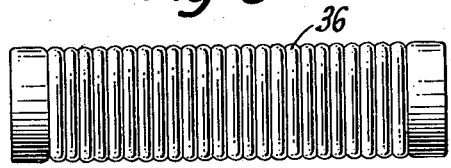 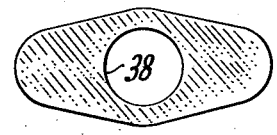
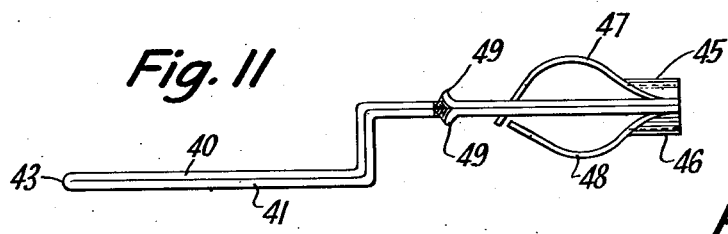
Fig. 11
Fig. 13             Fig. 12
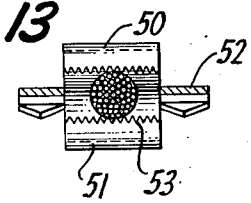 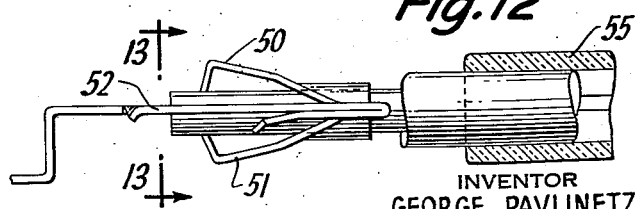
INVENTOR
GEORGE PAVLINETZ
BY
Raymond W Colton
ATTORNEY July 15, 1952   G. PAVLINETZ   2,603,679
TERMINAL HAVING SOLDERLESS CONDUCTOR CLAMPING MEANS
Filed June 23, 1949   3 Sheets-Sheet 3

INVENTOR
GEORGE PAVLINETZ
BY
Raymond W Colton
ATTORNEY

Patented July 15, 1952

2,603,679

UNITED STATES PATENT OFFICE 2,603,679

TERMINAL HAVING SOLDERLESS CONDUCTOR CLAMPING MEANS

George Pavlinetz, Carteret, N. J.

Application June 23, 1949, Serial No. 100,813

14 Claims. (Cl. 173—269)

My invention relates to cables and electrical conductor terminals, more particularly to clamp type solderless terminals.

The principal object of my invention is to provide an improved cable terminal of the solderless type, and more particularly of the clamp type.

Another object of my invention is to provide such a terminal which can be readily attached to the ends of a cable by an unskilled worker and without the use of attaching tools or machinery.

A further object of my invention is to provide a terminal of the self-locking type whereby the conductor or cable can be inserted into the terminal and anchored in permanently locked position.

A still further object of my invention is to provide a locking means in the form of an insulating sleeve, which also protects the terminal and is easy to adjust to locking position.

Another object of my invention is to provide such a sleeve which prevents fraying of the insulation on cable or conductor.

A still further object of my invention is to provide a simple and inexpensive punched terminal which can be formed from sheet stock.

A further object of my invention is to provide such a terminal which may be utilized with either solid or stranded conductors.

A further object of my invention is to provide such a terminal which may be used as a temporary connection without the locking feature, or which can be utilized with the locking feature.

These and other objects will appear hereinafter.

Figure 1:
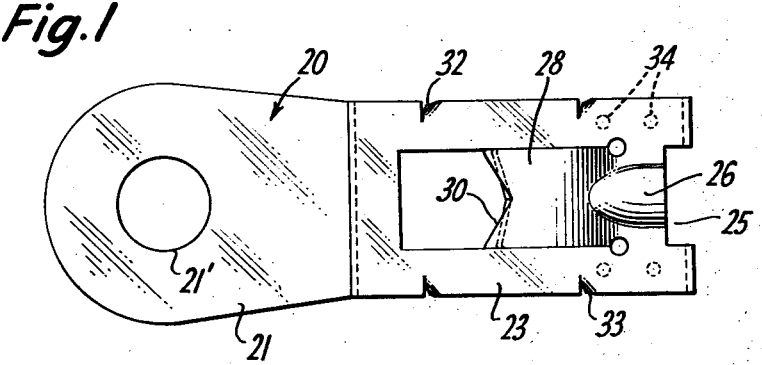
Figure 2:
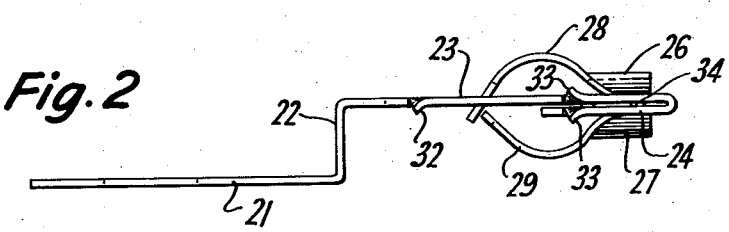
Figure 3:
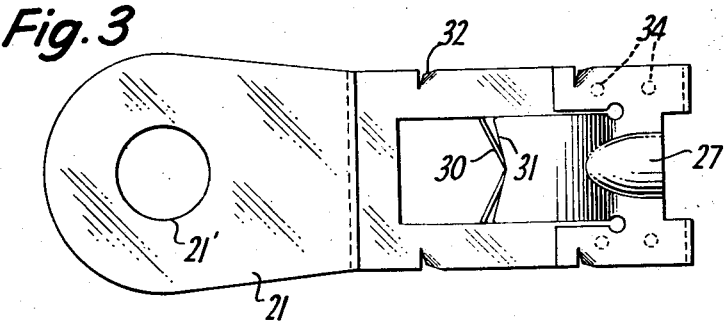
Figure 4:
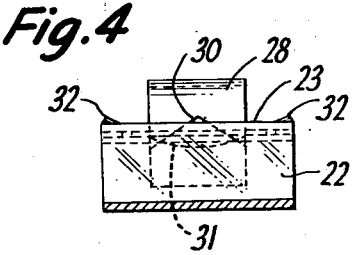
Figure 5:
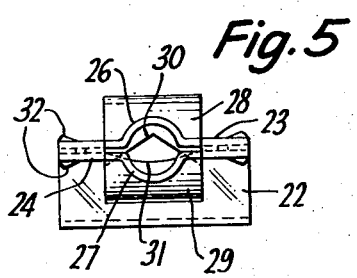
Figure 14:
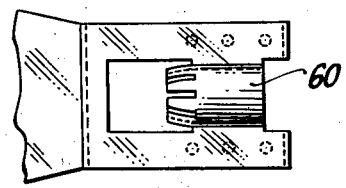
Figure 15:
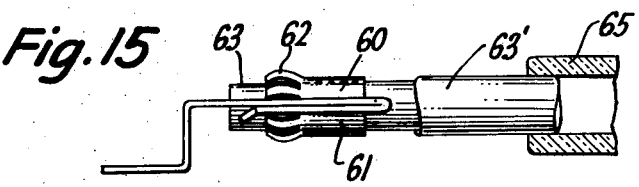
Figure 16:
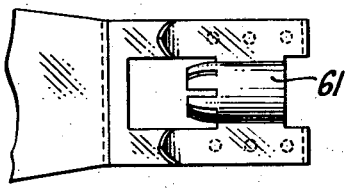
Figure 17:
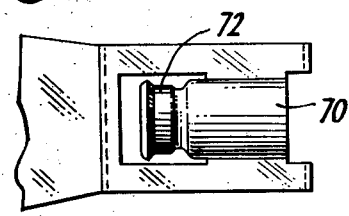
Figure 18:
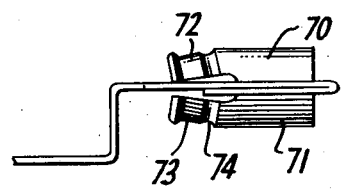

The novel features which I believe to be characteristic of my invention are set forth with particularity in the appended claims, but the invention itself will best be understood by reference to the following description taken in connection with the accompanying drawing in which Figure 1 is a top plan view of one form of my invention; Figure 2 is a side elevation of Figure 1, and Figure 3 is a bottom plan view of Figures 1 and 2, Figure 4 is a left end elevation partially sectioned and Figure 5 is the right end elevation of the connector terminal made according to my invention; Figure 6 shows a terminal connector with a conductor received therein prior to positioning the locking sleeve insulator in locked position; Figure 7 is a view partially in section of my terminal connector in locked position; Figures 8, 9 and 10 show side and end elevation details of the insulating locking sleeve used with the terminal shown in Figures 1 to 7 inclusive; Figure 11 is a side elevation of a modification of the invention shown in Figures 1 to 7 inclusive; Figure 12 is an elevation of a still further modification of my invention; Figure 13 is a section taken along the line 13—13 of Figure 12; Figure 14 is a top plan view of another form of my invention and Figure 15 is a side elevation with the locking member in retracted position; Figure 16 is a bottom plan view of the device shown in Figures 14 and 15; Figure 17 is a plan view of a still further modification of my invention; Figure 18 is a side elevation and Figure 19 a side elevation with parts in section of the device with a conductor therein and the locking element in locking position.

Referring to the drawings, in Figure 1 the terminal connection is punched from flat stock and then formed to shape as shown. The terminal designated generally at 20 is provided with a flat enlarged head member 21 provided with aperture 21' for receiving a screw or other form of connection. It is provided with a vertically extended portion 22 which is extended into the horizontal portion 23 bent upon itself so that it has an underlying portion 24. The upper portion or leg, as best seen in Figure 1, is rectangularly shaped and has a portion removed at 25 to form a recess. Adjacent this end of the terminal connector the upper portion and lower portions 23 and 24 are both provided with rounded portions 26 and 27 displaced outwardly and oppositely disposed so as to provide a tubular passageway for purposes to be described.

A resilient arm 28 extending back from the tubular passageway is curved upwardly as shown and downwardly so as to be oppositely disposed to a like arm 29 on portion 24. As formed they result in flexible arm members, the free ends of which are provided with recesses and sharp edges for purposes to be described. The recessed portions in the upper arm 28 may be reshaped as indicated at 30 and the recess in the lower arm may have a rounded shape as indicated at 31 in Figures 3 and 5.

Barbs or offset elements 22 are formed by slotting and bending out of the plane of the upper portion 23. Like barbs can be formed at 33. The upper and lower folded portions may be spot welded at 34 if desired.

While the device may be utilized as shown to provide a temporary connection, it is preferable to use the same with a locking device as shown in Figures 6 and 7. This comprises an insulating sleeve of the shape shown in Figures 8, 9 and 10. One end is provided with a rectangularly shaped bore or chamber 37 and the other end with a round bore 38. Longitudinally extending slots 39 are coextensive with the rectangularly shaped portion of the passageway.

To secure a conductor 35 having insulation covering 35' it is inserted through the tubular portion formed by portions 26 and 27 of the terminal and forced between the free ends of the resilient arms 28 and 29 and is engaged by the sharp edges of the free ends of these arms. The forcing of the conductor between the spring arms 26 and 27 forces the arms outwardly against the natural resiliency induced by the spring shape of the arms. Efforts to pull the conductor out of the tubular portion tends to force the sharp edges into the surface of the conductor. The upper arm 28 may be made slightly longer than the lower arm 29, or this may be reversed.

When it is desired to lock the conductor permanently, an insulating sleeve member 36 of any desired material is first inserted over the conductor prior to insertion of the conductor into the tubular portion of the terminal. The slots 29 register with the edges of the upper and lower members 23 and 24 to receive that portion of the edges outside of the tubular portions. In forcing the locking insulating sleeve to the left the spring arms are further pushed against the conductor and the barbed elements 32 and 33 engage the slot walls to retard removal of the insulating sleeve from the terminal. In this fashion the terminal is permanently locked to the conductor. Inasmuch as the sleeve extends beyond the insulated end of the conductor as shown in Figure 7 this acts to protect the insulation from damage and fraying, insuring a properly insulated connection at all times.

In Figure 11 I show a modification of the arrangement shown in Figures 1 to 7 inclusive. The terminal is again punched from ribbon stock, but in this case the fold between the upper and lower portions 40 and 41 is made at 43 with both portions in contact with each other and the free ends are provided with the semicircular portions 45 and 46 to form the tubular passageway, the arms 47 and 48 extending therefrom as shown in Figures 1 to 7 inclusive, and the barbs 49 provided as before. They are moved to locking position with the insulating sleeve shown in Figures 8 to 10 inclusive.

I show a still further modification of my invention in Figures 12 and 13. In this arrangement the flexible arms 50 and 51 are provided with straight edges for engaging multi-strand conductors. It will be noted that these edges are serrated at 52 and 53 to provide a plurality of fine oppositely disposed teeth. In this arrangement it is preferable not to weld the upper and lower portions of the terminal connected together since it is advisable in this case to open the jaw-like arrangement to permit easy insertion of the end of the conductor between the free ends of the flexible arms, the locking insulator being forced home after the jaws are closed.

In Figures 14 to 16 inclusive I show a still further modification of my invention in which the tubular portions 60—61 are extended into finger-like elements 52 formed by slotting the inner ends of the half tubular portions so as to provide inwardly extending fingers which are expanded outwardly by the introduction of a conductor 63 having insulating coating 63' into the tubular portion. The insulating locking sleeve 65 is provided as shown in other forms described.

Figure 19:
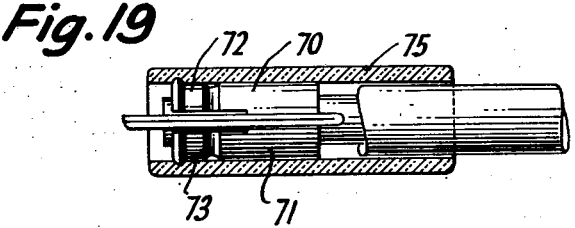

In Figures 17 to 19 inclusive I show a still further form of my invention. The tubular portions 70 and 71 are extended into the portions 72 and 73 having the annular recess 74 and being bent toward each other as shown in Figure 18. The conductor again is engaged by the free ends of the sleeves and the ends are forced into contact with the conductor by means of the insulating sleeve 75 which forces the outwardly flared ends against the conductor received within the tubular passageway.

It is of course understood that the terminal connector or fastener can be designed and manufactured in various shapes and sizes. It is also obvious that it can be used with a solid conductor or finely twisted conductors whether small or large size, as well as twisted pairs or branded cables. It is preferred that the terminal be made of metal which is thin or tough relative to the cables which are to be fastened, such as phosphor spring cable which is a good conductor as well as a very tough metal. The lug for securing the terminal can, of course, be of various shapes and can be formed at either end if desired. The terminals may also be manufactured as a single unit or in gang form and may be used with or without the locking sleeves.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim as new is:

1. A connector of sheet metal for receiving and securing a wire-like element including a member having at one end a tubular portion of greater length than diameter and providing a passageway and receptacle for said element, said connector having a pair of spaced oppositely disposed flexible arms one end of which is secured to the tubular portion, the free ends registering with the passageway for engaging and securing the end of the element received within and extending from said tubular portion; the ends of said arms providing oppositely-disposed jaws biased toward each other, said ends being provided with recesses having sharp edges for engaging said element therebetween with a biting action for resisting withdrawal of said element from said tubular portion.

2. A terminal connector for electrical conductors including a member having at one end a tubular portion providing a passageway and a receptacle for a conductor, said connector having a pair of spaced oppositely disposed flexible arms with their ends registering with said passageway for engaging the end of a conductor received within and extending from said tubular portion, the free ends of said arms having recesses provided with sharp edges for engaging said conductor therebetween with a biting action for resisting withdrawal of said conductor, and a sleeve receiving said tubular portion and said arms engaging said arms for forcing the free ends thereof into tight engagement with said conductor.

3. A connecting terminal of said sheet metal for electrical conductors including oppositely disposed portions in contact with each other, one end of said portions being provided with oppositely disposed depressions forming a tubular passageway therebetween for receiving a conductor therein, said terminal being provided with flexible oppositely disposed arms having their fixed ends adjacent said passageway, the free ends of which register with each other and with the passageway through the tubular portion of said connector providing the clamping jaws for engaging the end of a conductor received within and extending from said tubular portion.

4. A connecting terminal for electrical conductors including a sheet metal member having oppositely disposed portions in contact with each other, one end thereof being provided with oppositely disposed depressions forming a tubular passageway therebetween for receiving a conductor therein, said portions being provided with flexible oppositely disposed arms, the free ends of which register with each other and with the passageway through the tubular portion of said connector for engaging the end of a conductor received within and extending from said tubular portion, and means including a sleeve received over said portions for engaging said arms to force said arms into tight contact with said conductor.

5. A terminal connector of sheet metal having portions folded over against each other, said portions having at one end oppositely disposed outwardly displaced areas forming a tubular passageway therebetween, and other areas of said portions adjacent said tubular passageway forming oppositely disposed flexible arms, the free ends of which are turned toward each other forming registering jaws which register with the tubular passageway for engaging a conductor extending through and from said passageway, said free ends being biased toward each other to provide a biting action on said conductor for resisting removal of said conductor from said terminal connector.

6. A terminal connector of sheet metal having portions folded over against each other, said portions having at one end oppositely disposed outwardly displaced areas forming a tubular passageway therebetween, and other areas of said portions adjacent said tubular passageway forming oppositely disposed flexible arms having their fixed ends adjacent the tubular passageway, the free ends extending away from said tubular passageway and turned toward each other forming registering jaws registering with the tubular passageway for engaging a conductor extending within and from said passageway, said free ends being biased toward each other to provide a biting action on said conductor for resisting removal of said conductor from said terminal connector.

7. A terminal connector of sheet metal having portions folded against each other, said portions having at one end oppositely disposed outwardly displaced areas forming a tubular passageway therebetween, and other areas of said portions adjacent said tubular passageway forming oppositely disposed flexible arms, the free ends of which are turned toward each other and register with the tubular passageway for engaging a conductor extending through and from said passageway, and a locking member engaging said portions and provided with a tubular passageway therethrough having oppositely disposed slots extending therealong for receiving said sheet metal terminal, the edges of said terminal being received within said slots and said arms being engaged by the tubular passageway of said locking member to force said arms into tight contact with said conductor for locking said conductor within said terminal.

8. A terminal connector of sheet metal having registering portions folded against each other, said portions having at one end oppositely disposed outwardly displaced areas forming a tubular passageway therebetween, and other areas of said portions adjacent said tubular passageway forming oppositely disposed flexible arms, the free ends of which are turned toward each other and register with the tubular passageway for engaging a conductor extending through and from said passageway, and an insulating locking member engaging said portions and provided with a tubular passageway therethrough having oppositely disposed slots extending therealong for receiving said sheet metal terminal, the longitudinal edges of said terminal being received within said slots and said arms being engaged by the wall of said tubular passageway of said locking member to force the free ends of said arms into tight contact with said conductor for locking said conductor within said terminal.

9. A terminal connector of sheet metal having registering portions folded against each other, said portions having at one end oppositely disposed outwardly displaced areas forming a tubular passageway therebetween, and other areas of said portions adjacent said tubular passageway forming oppositely disposed flexible arms, the free ends of which are turned toward each other and register with the tubular passageway for engaging a conductor extending through and from said passageway, and a locking member engaging said portions and provided with a tubular passageway therethrough having oppositely disposed slots extending therealong for receiving said sheet metal terminal, the longitudinal edges of said terminal being received within said slots and said arms being engaged by the tubular passageway to force said arms into tight contact with said conductor for locking said conductor within said terminal, said longitudinal edges being provided with outwardly turned barbed portions for engaging the surfaces of said slots to resist removal of said locking member from said terminal.

10. A connector of sheet metal having portions folded against each other, said portions having at one end oppositely disposed outwardly displaced areas forming a tubular passageway therebetween, and other areas of said portions adjacent said tubular passageway forming oppositely disposed flexible arms, the free ends of which are turned toward each other and registering with the tubular passageway for engaging the conductor extending through and from said passageway, and a locking member engaging said portions and provided with a tubular passageway therethrough having oppositely disposed slots extending therefrom for receiving said sheet metal terminal, the edges of said terminal being received within said slots and said arms being engaged by the tubular passageway to force said arms into tight contact with said conductor for locking said conductor within said terminal.

11. A terminal connector of sheet metal having registering portions folded against each other, said portions having at one end oppositely disposed outwardly displaced areas forming a tubular passageway therebetween, and other areas of said portions adjacent said tubular passageway forming oppositely disposed flexible arms, the free ends of which are turned toward each other and registering with the tubular passageway for engaging a conductor extending through and from said passageway, and a locking member engaging said portions and provided with a tubular passageway therethrough having oppositely disposed slots extending therefrom for receiving said sheet metal terminal connector, the edges of said terminal being received within said slots and said arms being engaged by the tubular passageway to force said arms into tight contact with said conductor for locking said conductor within said terminal, the ends of said flexible arms engaging said conductor being provided with a straight edge having a plurality of fine teeth therein.

12. A terminal connector of sheet metal having registering portions folded against each other, said portions having at one end oppositely disposed outwardly displaced areas forming a tubular passageway therebetween, and other areas of said portions adjacent said tubular passageway forming oppositely disposed flexible arms, the free ends of which are turned toward each other and registering with the tubular passageway for engaging the conductor extending through and from said passageway, and a locking member engaging said portions and provided with a tubular passage therethrough for receiving said sheet metal terminal connector, said arms being engaged by the tubular passageway to force said arms into tight contact with said conductor for locking said conductor within said terminal, the ends of said flexible arms engaging said conductor being provided with a straight edge having a plurality of fine teeth therein.

13. A terminal connector of sheet metal having registering portions folded against each other, said portions having at one end oppositely disposed outwardly displaced areas forming a tubular passageway therebetween, said tubular portions being provided with fingers extending from the inner edge thereof for engaging said conductor, the free ends of said fingers being turned toward each other and registering with the tubular passageway for engaging a conductor extending through and from said passageway, and a locking member engaging said portions and provided with a tubular passage therethrough for receiving said sheet metal terminal connector, said fingers being engaged by the tubular passageway to force said fingers into tight contact with said conductor for locking said conductor within said terminal.

14. A terminal connector of sheet metal having registering portions folded against each other, said portions having at one end oppositely disposed outwardly displaced areas forming a tubular passageway therebetween, the tubular portions each being provided with an outwardly flared semi-cylindrical portion having an inwardly directed annular recess for engaging a conductor, the free ends of said flared portions being turned toward each other and register with the tubular passageway for engaging the conductor extending through and from said passageway, and a locking member engaging said portions and provided with a tubular passage therethrough for receiving said sheet metal terminal connector, said flared portions being engaged by the tubular passageway to force the annular recessed portions into tight contact with said conductor for locking said conductor within said terminal.

GEORGE PAVLINETZ.

REFERENCES CITED

The following references are of record in the file of this patent:

UNITED STATES PATENTS

| Number | Name | Date |
|---|---|---|
| 1,586,279 | Batchelder et al. | May 25, 1926 |
| 1,635,256 | Carter | July 12, 1927 |
| 1,678,082 | Rottenburg | July 24, 1928 |
| 1,724,729 | Ruttenberg et al. | Aug. 13, 1929 |
| 2,336,517 | Wade | Dec. 14, 1943 |
| 2,478,143 | Watts | Aug. 2, 1949 |

FOREIGN PATENTS

| Number | Country | Date |
|---|---|---|
| 206,628 | England | Nov. 15, 1923 |